Patented May 31, 1938

2,119,167

UNITED STATES PATENT OFFICE 2,119,167

METHOD OF MAKING ALKYL HALIDES

Thomas Kane, Holborn, London, England, assignor to Edward Halford Strange, Ventnor, Isle of Wight, England No Drawing. Original application January 13, 1931, Serial No. 508,559. Divided and this application September 25, 1935, Serial No. 42,145. In Great Britain January 20, 1930

4 Claims. (Cl. 260—166)

This application which is a division of my application No. 508,559, filed January 13, 1931 relates to the manufacture of alkyl halides from olefines or mixtures containing olefines.

As heretofore proposed alkyl halides may be made by reacting an olefine with a suitable hydroacid of the halogens other than fluorine and iodine such as hydrochloric or hydrobromic, either at an elevated temperature or at a low or high temperature under pressure, with or without the use of a catalyst. While by such processes it is possible to produce alkyl halides they are not commercially practical because they are either too difficult to control, or the yield of the final product obtained is too low.

It has been found that by treating an olefine with hydro-acid of the halogens other than fluorin and iodine in the presence of an adsorbent material, the reaction can be made to proceed more quickly and smoothly than otherwise, with the resulting production of alkyl halides in increased yields.

According to the present invention a hydroacid of the halogens other than fluorine and iodine such as hydrochloric or hydrobromic acid is caused to combine with an olefine or olefines by bringing the hydro-acid of the halogens other than fluorin and iodine into contact with the olefine or olefines in the presence of an adsorbing material hereinafter termed adsorbent which is substantially chemically inert with respect to said hydro-acid. The olefines employed may be either propylene, butylene, amylene, or hexylene or a mixture of said olefines.

The adsorbent may be the siliceous mass obtained by treating a zeolite or complex silicate, for instance, glauconite, with the customary leaching acids, in the known manner, and then completely or partially dehydrating same, (commonly known to the trade as "Glaucosil") alone or in admixture, with or without other substances. The term "acid treated" as employed in the appended claims is intended to signify treatment with the customary leaching acids in the known manner.

The reaction may be carried out at, above, or below atmospheric pressure, and heat may be added to or extracted from the reaction mixture as desired. Whether the reaction be carried out with or without heat or pressure or both is dependent upon the particular olefine or olefines and hydro-acid of the halogens other than fluorine and iodine employed.

The hydro-acid of the halogens other than fluorine and iodine and the olefine or olefines may be mixed together before being brought into contact with the adsorbent, or either of them may be brought into contact with the adsorbent first and the other introduced subsequently. The olefine or olefines in some cases may be diluted or mixed with other substances for instance, when products resulting from the thermal decomposition of petroleum are employed, the presence of the saturated hydrocarbons is not detrimental to the reaction and may be an aid in carrying out the process as it serves to reduce the reaction temperature.

The olefine or olefines and the hydro-acid of the halogens other than fluorine and iodine should preferably be in an anhydrous or nearly anhydrous condition before they are caused to react together to form alkyl halides.

In carrying out the process according to this invention the adsorbent may be placed in a chamber provided with means for adding to or extracting part or whole of the adsorbent, so that a portion of the alkyl halide is removed from the reaction chamber continuously or at intervals, with the adsorbent and any other substances therein or thereon. The adsorbed and/or condensed products are then removed from the adsorbent which may be returned to the chamber for reuse in the process. The remainder of the alkyl halides pass out of the reaction chamber in a volatile form, together with any surplus reaction materials, diluents or by-products which are gases or in a volatile state. The products, byproducts, and other substances may be separated and/or recovered in any suitable manner, for example by distillation and condensation either by cold and/or pressure, counter-current washing with a solvent or by solution in a cooled solvent, or by adsorption in a porous body and subsequent distillation.

When products resulting from the thermal decomposition of petroleum are used as the source of olefine or olefines, the residual products are rendered free from olefine or olefines by undergoing the process, and the residual products can then be employed for the manufacture of alkyl chlorides or bromides by the use of chlorine or bromine respectively, in a known manner. The hydrohalogen acid formed in this last reaction can then be used for treating further quantities of olefines or mixtures containing olefines.

Specific examples of the process according to the present invention are as follows:

Example 1

500 parts by weight of the adsorbent is placed in a vessel made of a material which is chemically inert to the action of a hydro-acid of the halogens other than fluorine and iodine. The vessel is provided with both an inlet and an outlet pipe. The outlet pipe is connected to a condenser. 90 parts by weight of propylene and 80 parts or more of hydrochloric acid in gaseous form either separately or in admixture, are introduced through the inlet pipe into the vessel. The propylene and hydrochloric acid when in contact with the adsorbent combine to form propyl chloride accompanied with the evolution of considerable heat. The temperature is so regulated by controlling the rate of flow of the respective gases into the vessel or by cooling or heating the vessel that it does not exceed about 100° C. When about 80% of the batch of acid and propylene has been added to the vessel some of the propyl chloride admixed with a trace of hydrochloric acid begins to escape through the outlet pipe into the condenser wherein it is condensed and collected, and this continues until the treatment of the entire batch of propylene and acid is completed.

The propyl chloride which has collected in the condenser is then withdrawn therefrom, and may be recovered in a purified state in any well known manner.

The adsorbent in situ is then heated up to about 120° C. so as to drive off the propyl chloride associated therewith. Steam or water may be added towards the end of the distillation to assist in the removal of the last traces of chloride. The chloride liberated is discharged through the outlet pipe into the condenser wherein it condenses and collects. After the chloride has been liberated from the adsorbent the latter may be cooled and immediately used for treating further quantities of propylene and hydrochloric acid, or if necessary, it may be withdrawn from the vessel, and revivified in any well known manner, and then returned to the vessel for reuse in the process. The yield of propyl chloride is about 95% or over of the theoretical amount.

In place of carrying out the reaction with a stationary bed of adsorbent, the adsorbent may be introduced into and withdrawn from the reaction sphere or vessel as the reaction proceeds either at intervals or in a continuous manner, and the propyl chloride recovered from the adsorbent, whereupon the adsorbent may or may not be returned to the reaction sphere.

If desired, propyl bromide may be prepared in the same manner by using hydrobromic in place of hydrochloric acid.

Example 2

112 parts by weight of butylene and 80 or more parts by weight of hydrochloric acid in gaseous form, either separately or in admixture, are introduced into the same apparatus as in Example 1, charged with 500 parts by weight of the adsorbent. Preferably, the gases are admitted at such rate that the temperature is insufficient to expel the butyl chloride as it is formed. The bulk of the butyl chloride which is associated with the adsorbent, and also that contained in the condenser may be recovered in the same manner as described in Example 1.

Butyl bromide may be prepared in the same manner by using hydrobromic acid in place of hydrochloric acid.

Example 3

Into the apparatus as described in Example 1, charged with 500 parts by weight of the adsorbent are introduced 140 parts by weight of amylene and 80 parts or more of hydrochloric acid in gaseous form, either separately or in admixture. The gases may be admitted at such rate that the temperature is insufficient to expel the amyl chloride as it is formed. The amyl chloride which is associated with the adsorbent and also that contained in the condenser may be recovered in the same manner as described in Example 1.

Amyl bromide may be made in the same manner by using hydrobromic in place of hydrochloric acid.

Example 4

Into an apparatus as described in Example 1 charged with 500 parts by weight of the adsorbent is passed a gas obtained from the thermal decomposition of mineral oils and containing approximately 4% butylene, 18% propylene, and 22% ethylene mixed with hydrobromic acid in an amount equal in volume to, or in excess of, the whole of the olefines present in the gas. The propylene, butylene and ethylene contained in the gas react with the hydrobromic acid to form propyl bromide, butyl bromide, and ethyl bromide respectively, which bromides may be recovered from the effluent gases for example by cooling or by washing with a cooled solvent or by adsorption in or on an adsorbent porous body in known manner, and by subsequent distillation from the solvent or adsorbent porous body. The bromides in or on the adsorbent employed in the reaction vessel may be recovered from the adsorbent in the same manner as described in Example 1.

Example 5

The effluent gases from Example 4 consisting chiefly of hydrogen, methane, ethane, propane, and butane, are passed into a tube at high velocity wherein they are mixed with chlorine or bromine in a known manner to produce chiefly the alkyl chlorides or bromides of ethane, propane or butane mixed with hydrochloric acid or hydrobromic acid as by-products. The alkyl chlorides or bromides are separated from the hydrochloric or hydrobromic acids and these acids may be used in the process for making alkyl chlorides or bromides from olefines as described in any of the preceding examples.

It is to be understood that although definite quantities of materials are given in the foregoing examples they are only given by way of illustration as to the manner in which the invention may be performed, and the invention is not limited in any way to these examples, nor to the quantities, temperatures and pressures, as they may be varied within wide limits. Neither is the process restricted to pure olefines or mixtures of olefines, or olefines and paraffin hydrocarbons, as it is of utility for making alkyl halides from any mixture or mixtures of gases containing olefines whether liquid or not, providing that neither the admixed substances nor tarry or resinous and other materials that may be formed do not clog the pores or surfaces of or otherwise interfere with the efficiency of the adsorbent.

Having thus described the invention, what is claimed as new and desired to be secured by Letters Patent is:

1. The process for the manufacture of alkyl halides consisting in reacting a gaseous mixture of an olefine hydrocarbon and hydrogen chloride in the presence of a catalytic substance essentially comprising a dehydrated complex inorganic silicate selected from the group comprising the zeolites and glauconite which catalytic substance has previously been treated by leaching with a strong mineral acid.

2. The process for the manufacture of alkyl halides consisting in reacting a gaseous mixture of an olefine hydrocarbon and hydrogen chloride in the presence of a catalytic substance essentially comprising a zeolite which catalytic substance has previously been treated by leaching with a strong mineral acid.

3. The process for the manufacture of alkyl halides consisting in reacting a gaseous mixture of an olefine hydrocarbon and hydrogen chloride in the presence of a catalytic substance essentially comprising a glauconite which catalytic substance has previously been treated by leaching with a strong mineral acid.

4. The process for the manufacture of alkyl halides consisting in reacting a gaseous mixture of an olefine hydrocarbon and hydrogen chloride in the presence of a catalytic substance essentially comprising "Glaucosil."

THOMAS KANE.